United States Patent
Oda et al.

(10) Patent No.: US 7,604,899 B2
(45) Date of Patent: Oct. 20, 2009

(54) POSITIVE ELECTRODE ACTIVE MATERIAL FOR NON-AQUEOUS ELECTROLYTE SECONDARY BATTERY AND MANUFACTURING METHOD THEREOF, AND NON-AQUEOUS ELECTROLYTE SECONDARY BATTERY USING SAME

(75) Inventors: Syuuhei Oda, Ehime-ken (JP); Ryuichi Kuzuo, Ehime-ken (JP); Tomoyoshi Ueki, Aichi-ken (JP); Satoru Suzuki, Aichi-ken (JP); Manabu Yamada, Aichi-ken (JP)

(73) Assignees: Sumito Metal Mining Co., Ltd., Tokyo (JP); Toyota Jidosha Kabushiki Kaisha, Aichi-Ken (JP); Denso Corporation, Aichi-Ken (JP)

( * ) Notice: Subject to any disclaimer, the term of this patent is extended or adjusted under 35 U.S.C. 154(b) by 82 days.

(21) Appl. No.: 11/723,892

(22) Filed: Mar. 22, 2007

(65) Prior Publication Data

US 2007/0248883 A1 Oct. 25, 2007

(30) Foreign Application Priority Data

Mar. 23, 2006 (JP) .............................. 2006-080375

(51) Int. Cl.
*H01M 5/52* (2006.01)
(52) U.S. Cl. ................................. 429/231.95
(58) Field of Classification Search ............... 429/231.1, 429/224, 231.3, 221, 220, 231.5, 223, 338, 429/330, 337, 340, 231.95, 231.8, 231.6, 429/229, 233; 423/594.4
See application file for complete search history.

(56) References Cited

U.S. PATENT DOCUMENTS

2005/0147889 A1* 7/2005 Ohzuku et al. ........... 429/231.1

FOREIGN PATENT DOCUMENTS

| JP | 8-45509 | 2/1996 |
| JP | 08-045509 | 2/1996 |
| JP | 08-213015 | 8/1996 |
| JP | 8-213015 | 8/1996 |
| JP | 2000-323123 | 11/2000 |
| JP | 2001-52704 | 2/2001 |

* cited by examiner

*Primary Examiner*—Patrick Ryan
*Assistant Examiner*—Monique Wills
(74) *Attorney, Agent, or Firm*—Finnegan, Henderson, Farabow, Garrett & Dunner, L.L.P.

(57) ABSTRACT

To provide a positive electrode active material for a non-aqueous electrolyte secondary battery, which if used as a positive electrode for a lithium ion secondary battery, the battery internal resistance can be reduced, giving a secondary battery superior in output characteristics and life property. After mixing raw material powders in specified quantities of each so as to become a lithium-metal complex oxide represented by $Li_zNi_{1-w}M_wO_2$ (wherein M is at least one kind or more of metal elements selected from the group consisting of Co, Al, Mg, Mn, Ti, Fe, Cu, Zn, and Ga; and w and z respectively satisfy $0<w\leqq0.25$, and $1.0\leqq z\leqq1.1$), baking is performed in two stages. At first the temperature is raised from room temperature to a first stage baking temperature (450 to 550° C.) at a temperature rise rate of 0.5 and 15° C./min, and held for 1 to 10 hours. Then the temperature is raised to a second stage baking temperature (650 to 800° C.), and held for 0.6 to 30 hours.

8 Claims, 1 Drawing Sheet

POSITIVE ELECTRODE ACTIVE MATERIAL FOR NON-AQUEOUS ELECTROLYTE SECONDARY BATTERY AND MANUFACTURING METHOD THEREOF, AND NON-AQUEOUS ELECTROLYTE SECONDARY BATTERY USING SAME

TECHNICAL FIELD

The present invention relates to a positive electrode active material for a non-aqueous electrolyte secondary battery and a manufacturing method thereof, a non-aqueous electrolyte secondary battery using the active material, and in particular to an active material using a lithium-nickel complex oxide, and a non-aqueous electrolyte secondary battery using the active material.

BACKGROUND ART

Accompanying the popularization of portable devices such as cellular telephones and notebook-sized personal computers, a small size and lightweight secondary battery having high energy density is required. As a secondary battery to fulfill such characteristics, there is the lithium ion secondary battery, and research and development is being actively performed, and practical use thereof is progressing.

Moreover, in the automotive field, the demand for electric cars that are able to address resource and environmental problems is increasing. Therefore, a battery for driving a motor for electric car use and hybrid car use is required. As a secondary battery which is applicable as a battery for driving a motor, the appearance of a lithium ion secondary battery that is inexpensive, and at the same time, has a large capacitance, and for which cycle characteristics and output characteristics are excellent, is much anticipated.

In a lithium ion secondary battery, as the negative electrode active material, materials in which Li ions are able to be desorbed and inserted such as lithium metal, lithium alloy, metallic oxides, and carbon are used.

As the positive electrode active material, lithium containing complex oxides in which Li ions are able to be desorbed and inserted, such as a lithium-cobalt complex oxide ($LiCoO_2$), and lithium-nickel complex oxide ($LiNiO_2$), are representative.

In such lithium containing complex oxides, $LiCoO_2$ is relatively easy to synthesize, and at the same time, when it is used as a positive electrode active material for a secondary battery, a 4V class high voltage is able to be obtained. Therefore, the secondary battery in which $LiCoO_2$ is used as the positive electrode active material, is anticipated as a secondary battery having a high energy density, and actual practical use thereof is progressing. Furthermore, regarding the lithium ion secondary battery which uses $LiCoO_2$, research and development for obtaining excellent initial capacitance characteristics and cycle characteristics is progressing, and already a variety of results have been obtained.

However, with $LiCoO_2$, because an expensive cobalt compound is used as the main raw material, this becomes a cause for cost increase. Actually, the unit cost per capacitance of a secondary battery in which $LiCoO_2$ is used as the positive electrode active material, is approximately four times more expensive than that of a nickel-hydrogen battery which has already been put to practical use as a secondary battery. Therefore, the applicable usage of the secondary battery in which $LiCoO_2$ is used as the positive electrode active material, is exclusively limited to the portable device field such as cellular telephones and notebook-sized personal computers.

If the positive electrode active material cost for a lithium ion secondary battery can be reduced, and a less expensive lithium ion secondary battery manufactured, it is possible to expand the application from not only small size secondary battery usage for currently popularized portable devices, but also to large size secondary battery usage for electric power storage and electric cars, so that industrially this has enormous significance.

Examples of positive electrode active materials other than $LiCoO_2$ for lithium ion secondary batteries include, lithium-nickel complex oxide ($LiNiO_2$) which uses nickel that is cheaper than cobalt. For the lithium ion secondary battery in which $LiNiO_2$ is used as the positive electrode active material, a higher capacitance than for the lithium ion secondary battery in which $LiCoO_2$ is used as the positive electrode active material, can be expected. Furthermore, since this shows a high battery voltage similarly to the lithium ion secondary battery in which $LiCoO_2$ is used as the positive electrode active material, development is being actively performed.

However, a lithium ion secondary battery in which $LiNiO_2$ is used as a positive electrode active material, has the following defects. That is to say, compared to the lithium ion secondary battery in which $LiCoO_2$ is used as the positive electrode active material, it is inferior in cycle characteristics, and at the same time, in a case of usage or storage under a high temperature environment, the battery performance is relatively easily impaired.

Therefore, it is an object to solve these defects, and various proposals have been made regarding the abovementioned $LiNiO_2$.

For example, in patent document 1 (Japanese Unexamined Patent Publication No. Hei 8-213015), with an object of improving self-discharge characteristics and cycle characteristics of a lithium ion secondary battery, there is proposed lithium containing complex oxides expressed by $Li_xNi_aCo_bM_cO_2$ (where, $0.8 \leq x \leq 1.2$, $0.01 \leq a \leq 0.99$, $0.01 \leq b \leq 0.99$, $0.01 \leq c \leq 0.3$, and $0.8 \leq a+b+c \leq 1.2$, and M is at least one kind of element selected from Al, V, Mn, Fe, Cu and Zn).

Moreover, in patent document 2 (Japanese Unexamined Patent Publication No. Hei 8-45509), as a positive electrode active material that is able to maintain excellent battery performance for storage or usage under a high temperature environment, there is proposed lithium containing complex oxides and the like expressed by $Li_wNi_xCoB_zO_2$ (where, $0.05 \leq w \leq 1.10$, $0.5 \leq x \leq 0.995$, $0.005 \leq z \leq 0.2$, and $x+y+z=1$).

The lithium-nickel complex oxides that are proposed in patent documents 1 and 2, both have higher charge capacity and discharge capacity compared to $LiCoO_2$. Furthermore, the cycle characteristics are also improved compared to conventional lithium-nickel complex oxide that is expressed by $LiNiO_2$. However, when manufactured by the conventional manufacturing method, the internal resistance is increased, and the output characteristics are not sufficient.

The causes are, mainly, because the electroconductivity of the positive electrode active material is low, and at the same time, Li ion diffusivity is not sufficient. Hence, at the time of making a battery, in order to ensure sufficient electroconductivity, it is necessary to increase the amount of conductive materials that are mixed with the positive electrode active material. As a result, there is a problem in that the capacity per mass and the capacity per volume for the overall battery become small.

In patent document 3 (Japanese Unexamined Patent Publication No. 2001-52704), it is disclosed that in a complex oxide expressed by the general formula $Li_wA_yQ_xCo_yO_2$ (where, A is at least one kind or more selected from Ge, Y, Si, Zr, and Ti; Q is at least one kind or more selected from Ni, Mn, Fe, and Al; and w, v, x, y are respectively the range of $0 \leq w \leq 1.2$, $0.02 \leq v \leq 0.125$, $0.01 \leq x \leq 0.175$, $0.01 \leq x/y \leq 0.25$), by making this mainly a hexagonal and/or a monoclinic crystal structure, and structuring a compatible phase in which two or more kind of phases having similar crystal form and dissimilar lattice constants, are contacted together across a grain boundary, a high power capacity positive electrode material and a secondary battery are provided.

However, synthesis thereof is complicated, and a long time is necessary for the synthesis time. Moreover, it is difficult to manufacture while maintaining the abovementioned structure, and hence the performance thereof is unstable.

In patent document 4 (Japanese Unexamined Patent Publication No. 2000-323123), there is disclosed a positive electrode active material comprising particles of lithium complex oxide which are porous particles consisting primarily of at least one kind or more of elements selected from the group of Co, Ni, and Mn, and lithium, and for which a pore mean diameter by pore distribution measurement using a mercury penetration method is in a range between 0.1 and 1 μm, and the total volume of pores having a diameter between 0.01 and 1 μm, is 0.01 cm$^3$/g or more, characterized in that the particles of the lithium complex oxide are spherical secondary particles, the average particle size of the spherical secondary particles are between 4 to 20 μm, the tap density is 1.8 g/cm$^3$ or more, and the inflection point of the volume decreasing rate by the Cooper plot method is 500 kg/cm$^2$ or more.

However, it is considered that if there are pores with a diameter of 0.1 μm or more, the tap density becomes small, and the contact area with the electrolyte per positive electrode active material unit mass increases, so that an improvement in the load characteristics is possible. However, because the contact area with the electrolyte is increased excessively, charge and discharge of the positive electrode active material is repeated, so that there is concern of deterioration in the life property of the secondary battery.

Moreover, in the Cooper plot method, active material powders are pelletized and pressed, and the particle strength is measured. Therefore, it is considered that rather than the strength of porous and non-porous particles being compared, the filling property and strength of the active material powders are compared. The higher the filling property, even under the same pressure, the pressure per one particle is decreased. Therefore, it is considered that the particle strength cannot be evaluated precisely. Hence, regarding the particles which have a similar tap density, the problem remains in that it is difficult to compare the rupture strength of the particle itself.

Furthermore, use of a hydroxide raw material which has a small tap density, and a double baking process for making the material porous are required. Therefore the production efficiency of the positive electrode active material is decreased, which is not desirable.

[Patent Document 1]
Japanese Unexamined Patent Publication No. Hei 8-213015
[Patent Document 2]
Japanese Unexamined Patent Publication No. Hei 8-45509
[Patent Document 3]
Japanese Unexamined Patent Publication No. 2001-52704
[Patent Document 4]
Japanese Unexamined Patent Publication No. 2000-323123

DISCLOSURE OF INVENTION

Problems to be Solved by the Invention

The present invention takes into consideration the above difficulties, and has an object of providing a positive electrode active material for a non-aqueous electrolyte secondary battery, which if used as a positive electrode for a lithium ion secondary battery, a secondary battery can be obtained for which the internal resistance is small and that is superior in output characteristics and life property. Moreover an object is to provide a method for stably manufacturing a positive electrode active material for a non-aqueous electrolyte secondary battery. Furthermore, an object is to obtain a non-aqueous electrolyte secondary battery which uses the positive electrode active material for a non-aqueous electrolyte secondary battery.

Means of Solving the Problems

A first aspect of a positive electrode active material for a non-aqueous electrolyte secondary battery according to the present invention comprises primary particles of a lithium-metal complex oxide powder which is a lithium-metal complex oxide powder represented by $Li_zNi_{1-w}M_wO_2$ (wherein M is at least one kind or more of metal elements selected from the group consisting of Co, Al, Mg, Mn, Ti, Fe, Cu, Zn, and Ga; and w and z respectively satisfy $0<w\leq0.25$, and $1.0\leq z\leq 1.1$), and secondary particles which are formed by aggregating a plurality of the primary particles, and is characterized in that; the shape of the secondary particles is spherical or spheroidal; 95% or more of the secondary particles have particle diameters of 20 μm or less; a mean particle diameter of the secondary particles is between 7 and 13 μm; a tap density of the particles is 2.2 g/cm$^3$ or more; in a pore distribution measurement using a nitrogen adsorption method, a mean volume of pores having a diameter of 40 nm or less in average is between 0.001 and 0.008 cm$^3$/g; and a mean crushing strength of the secondary particles is between 15 and 100 MPa. Here, the mean volume of pores having a diameter of 40 nm or less in average is, at the time of two times performing the pore distribution measurements using the nitrogen adsorption method, the mean value of measurement results of volumes of pores which have a diameter of 40 nm or less in average. Furthermore, the particle diameter of the secondary particles is from 1 to 20 μm, measured by a laser diffraction and scattering type particle size distribution measuring device (MICROTRAC-HRA manufactured by Nikkiso Co. Ltd.). Moreover, the mean crushing strength of the secondary particles is the mean value of measured values of each crushing strength for 20 pieces of secondary particles of 10.0 μm approximately, measured by using a micro-compression tester (manufactured by Shimadzu Corporation).

A second aspect of a positive electrode active material for a non-aqueous electrolyte secondary battery according to the present invention comprises primary particles of a lithium-metal complex oxide powder which is a lithium-metal complex oxide powder represented by $Li_zNi_{1-x-y}T_xL_yO_2$ (wherein T is at least one kind or more of metal elements selected from the group consisting of Co, and Mn; L is at least one kind or more of metal elements selected from the group consisting of Al, Mg, Ti, Fe, Cu, Zn, and Ga; and x, y, and z respectively satisfy $0<x<0.25$, $0<y\leq0.1$, $0<x+y\leq0.25$, and $1.0\leq z\leq1.1$), and secondary particles which are formed by aggregating a plurality of the primary particles, and is characterized in that; the shape of the secondary particles is spherical or spheroidal; 95% or more of the secondary particles have particle diameters of 20 μm or less; a mean particle diameter of the secondary particles is between 7 and 13 μm; a tap density of the particles is 2.2 g/cm$^3$ or more; in a pore distribution measurement using a nitrogen adsorption method, a mean volume of pores having a diameter of 40 nm or less in average is between 0.001 and 0.008 cm$^3$/g; and a mean crushing strength of the secondary particles is between 15 and 100 MPa.

For the abovementioned lithium-metal complex oxide it is preferable that, on 3a sites where Li ions are to be arranged in a layered rock-salt structure of LiNiO$_2$, a site occupancy rate of metal ion other than Li ion is of 2% or less. Here, 3a sites are, in a lithium nickelate (LiNiO$_2$) having a layered rock-salt structure as shown in FIG. 1, positions where Li atoms are arranged. 3b sites are, in a lithium nickelate (LiNiO$_2$) having a layered rock-salt structure as shown in FIG. 1, positions where Ni atoms are arranged. 6c sites are, in a lithium nickelate (LiNiO$_2$) having a layered rock-salt structure as shown in FIG. 1, positions where O atoms are arranged. The site occupancy rate of metal ions other than Li in the 3a site is obtained by Rietveld analysis of a powder X-ray diffraction pattern using Kα rays of Cu.

Preferably the primary particles in the secondary particles are generally arranged radially from a center of the secondary particle.

A non-aqueous electrolyte secondary battery according to the present invention, is characterized in that the positive electrode active material for a non-aqueous electrolyte secondary battery is used for a positive electrode.

A first aspect of a manufacturing method for a positive electrode active material for a non-aqueous electrolyte secondary battery according to the present invention comprises: a first step for producing a metal complex hydroxide containing Ni and metal M (where M is at least one kind or more of metal elements selected from the group consisting of Co, Al, Mg, Mn, Ti, Fe, Cu, Zn, and Ga) with a proportion of Ni:M=1−w:w (0<w≦0.25) in an atomic number ratio, and with a tap density of 1.7 g/cm$^3$ or more; a second step for weighing the metal complex hydroxide obtained in the first step and lithium hydroxide so that a ratio of an atomic number of Li to a total atomic number of Ni and metal M is between 1.0 and 1.1, and mixing to obtain a compound; and a third step for raising the temperature of the compound obtained in the second step, from room temperature to 450 to 550° C. at a temperature rise rate of 0.5 to 15° C./min, holding for 1 to 10 hours at the reaching temperature, and performing first stage baking, and then further raising the temperature to 650 to 800° C. at a temperature rise rate of 1 to 5° C./min, holding for 0.6 to 30 hours at the reaching temperature, and performing second stage baking, and then furnace cooling to obtain a positive electrode active material for a non-aqueous electrolyte secondary battery.

A second aspect of a manufacturing method for a positive electrode active material for a non-aqueous electrolyte secondary battery according to the present invention comprises: a first step for producing a metal complex hydroxide containing Ni and metal T (where T is at least one kind or more of metal elements selected from the group consisting of Co and Mn) with a proportion of Ni:T=1−x−y:x (0<x<0.25, 0<y≦0.1, and 0<x+y≦0.25) in an atomic number ratio, and with a tap density of 1.7 g/cm$^3$ or more; a second step for adding a compound of metal L (where L is at least one kind or more of metal elements selected from the group consisting of Al, Mg, Ti, Fe, Cu, Zn, and Ga) to the metal complex hydroxide obtained in the first step, and mixing, and producing a compound A containing Ni and metal L with a proportion of Ni:L=1−x−y:y (0<x<0.25, 0<y≦0.1, and 0<x+y≦0.25) in an atomic number ratio; a third step for weighing the compound A obtained in the second step and lithium hydroxide so that a ratio of an atomic number of Li to a total atomic number of Ni, metal T, and metal L is between 1.0 and 1.1, and mixing to obtain a compound B; and a fourth step for raising the temperature of the compound B obtained in the third step, from room temperature to 450 to 550° C. at a temperature rise rate of 0.5 to 15° C./min, holding for 1 to 10 hours at the reaching temperature, and performing first stage baking, and then further raising the temperature to 650 to 800° C. at a temperature rise rate of 1 to 5° C./min, holding for 0.6 to 30 hours at the reaching temperature, and performing second stage baking, and then furnace cooling to obtain a positive electrode active material for a non-aqueous electrolyte secondary battery.

A third aspect of a manufacturing method for a positive electrode active material for a non-aqueous electrolyte secondary battery according to the present invention comprises: a first step for producing a metal complex hydroxide containing Ni, metal T, and metal L (where T is at least one kind or more of metal elements selected from the group consisting of Co and Mn, and L is at least one kind or more of metal elements selected from the group consisting of Al, Mg, Ti, Fe, Cu, Zn, and Ga) with a proportion of Ni:T:L=1−x−y:x:y (0<x<0.25, 0<y≦0.1, and 0<x+y≦2.5) in an atomic number ratio, and with a tap density of 1.7 g/cm$^3$ or more; a second step for weighing the metal complex oxide obtained in the first step and lithium hydroxide so that a ratio of an atomic number of Li to a total atomic number of Ni, metal T, and metal L is between 1.0 and 1.1, and mixing to obtain a compound; and a third step for raising the temperature of the compound obtained in the second step, from room temperature to 450 to 550° C. at a temperature rise rate of 0.5 to 15° C./min, holding for 1 to 10 hours at the reaching temperature, and performing first stage baking, and then further raising the temperature to 650 to 800° C. at a temperature rise rate of 1 to 5° C./min, holding for 0.6 to 30 hours at the reaching temperature, and performing second stage baking, and then furnace cooling to obtain a positive electrode active material for a non-aqueous electrolyte secondary battery.

Effects of the Invention

A lithium ion secondary battery constructed using the positive electrode active material for a non-aqueous electrolyte secondary battery according to the present invention allows that the internal resistance of the battery can be reduced. Hence, a high power output for the battery possible, and also a high life property for the battery is possible. Therefore, the positive electrode active material according to the present invention can be ideally used in a secondary battery, in particular, a secondary battery for electric car use.

Moreover, the manufacturing method for a positive electrode active material for a non-aqueous electrolyte secondary battery according to the present invention allows that the positive electrode active material for a non-aqueous electrolyte secondary battery according to the present invention can be stably manufactured.

BEST MODE FOR CARRYING OUT THE INVENTION

In the case of using a non-aqueous electrolyte secondary battery as a power source for hybrid car use or electric car use, the output characteristics and cycle characteristics become especially important.

The charge and discharge reactions in a battery are progressed by making the Li ions inside the positive electrode active material go in and out reversibly. Because the going in and out of the Li ions is performed on the surface of the positive electrode active material through the medium of the electrolyte, then for the same amount of electric current, as the specific surface area of the positive electrode active material becomes larger, the current density per unit area of the active material becomes smaller, which acts advantageously for the Li ion diffusion. Consequently, making the particle diameters of the positive electrode active material as small as possible, and making the specific surface area larger, is superior in Li ion diffusion. Hence, capacitance decrease become small at the time of large current density (it is superior in load characteristics). Therefore, an improvement in output characteristics can be expected.

However, simply making the particle diameter of a positive electrode active material small, and pulverizing, causes an inconvenience in manufacturing such as generation of coarse particulate and the like. Moreover, when made for an electrode, it causes a decrease in the filling density, so that eventually it causes a decrease in the capacitance of the overall battery. Furthermore, in the case where the contact area with the electrolyte becoming large, the electrolyte and the positive electrode active material for a non-aqueous electrolyte secondary battery, are reacted by contacting. Hence, a coating film is formed on the surface of the active material, or a decomposition reaction of the electrolyte occurs, so that the cycle characteristics become worse.

Based on the above situation, the present inventors have once again examined positive electrode active materials and manufacturing methods thereof, in a variety of ways. Moreover, during the examination, attention was paid to the mean crushing strength of the secondary particles of the lithium complex oxide with diameters between 2 and 20 μm, which mainly constitute a positive electrode active material.

Then, the present inventors paid attention to the mean crushing strength of secondary particles of lithium complex oxide, and found that, by controlling the baking condition, the mean volume of pores inside the primary particles can be made an adequate value, and a high power, and a high life of the battery can be obtained due to a drop in the internal resistance of the battery. Concerning the influence of the baking condition on the characteristics of secondary particles of the lithium complex oxide, the following aspects were specifically noted.

(1) Controlling the temperature rise rate at the time of the first stage baking is effective for controlling the gas evolution level inside the complex particles of the baking material. Controlling the baking temperature in the second step is effective for controlling the growth of the primary particles.

(2) By controlling the temperature rise rate at the time of the first stage baking, and the baking temperature in the second step, inside a particle, pores with diameters below 40 nm and volumes between 0.001 and 0.008 cm$^3$/g, in the pore distribution measurement using a nitrogen adsorption method, can be produced.

(3) Pore distribution measured by the abovementioned nitrogen adsorption method has a correlation with the mean crushing strength of the secondary particles of the lithium complex oxide. Direct measurement of the pore distribution by the nitrogen adsorption method takes a lot of time and effort, however, measuring the mean crushing strength of the secondary particles of the lithium complex oxide is relatively easy.

From these aspects, it is found that by controlling the mean crushing strength of the secondary particles of the lithium complex oxide, the contact area between the electrolyte and the positive electrode active material for a non-aqueous electrolyte secondary battery can be regulated, and the output characteristics of the battery can be improved and a high life property of the battery can be achieved, thus leading to the present invention.

Hereunder is a detailed description of a positive electrode active material for a non-aqueous electrolyte secondary battery, and a manufacturing method thereof, according to the present invention.

1. Positive Electrode Active Material for Non-aqueous Secondary Battery

A positive electrode active material for a non-aqueous secondary battery according to the present invention comprises powders of lithium-metal complex oxides which are represented by $Li_zNi_{1-w}M_wO_2$ (wherein M is at least one kind or more of metal elements selected from the group consisting of Co, Al, Mg, Mn, Ti, Fe, Cu, Zn, and Ga; and w and z respectively satisfy $0<w\leq0.25$, $1.0\leq z\leq1.1$).

Co and Mn, mainly serve a role of stabilizing the crystal structure of the lithium-nickel complex oxide. When the crystal structure is stabilized, the cycle characteristics of the non-aqueous secondary battery are favorably sustained, especially deterioration of the battery capacity due to charging and discharging under high temperature, and storing under high temperature, is suppressed. Particularly in the case of Co, even if it is substituted for Ni in a complex oxide $LiNiO_2$, the capacitance is hardly decreased. Furthermore, the obtained complex oxide $LiNi_{1-a}Co_aO_2$ is a perfect solid-solution. Hence, even if a part of Ni is substituted by Co, a reduction in crystallinity is kept to a minimum.

Al, Mg, Mn, Ti, Fe, Cu, Zn and Ga, mainly serve a role of suppressing a decomposition reaction of an active material accompanying oxygen release, and improving thermal stability. Among these elements, Al is preferably used. This is because Al is superior for improving the thermal stability, and keeping a capacitance decrease to a minimum.

In the case where a total atomic ratio w of the additional elements M is larger than 0.25, in a lithium-metal complex oxide which is represented by $LiNi_{1-w}M_wO_2$, not only a phase of a layered rock-salt structure, but also a secondary phase such as a spinel structure or the like are generated. Therefore, a battery with good cycle characteristics can not be constructed.

The powder particle of the lithium-metal complex oxide in the positive electrode active material according to the present invention, comprises primary particles of the complex oxide, and secondary particles which are formed by aggregating a plurality of the primary particles of the complex oxide. Because this is constructed from primary particles and secondary particles, there is the advantage that there is no inconvenience in handling, and the filling density is not decreased. Furthermore, the shape of the secondary particles is spherical or spheroidal. Therefore there is an advantage in that the filling density is improved.

Moreover, 95% or more of the secondary particles have particle diameters of 20 μm or less. Therefore there is an advantage in that a decrease in electron conductivity into the secondary particle interior is suppressed, and a deterioration in load characteristics is suppressed. Furthermore, the tap density of the powder particles of the lithium-metal complex oxide in the positive electrode active material according to the present invention is 2.2 g/cm$^3$ or more. Hence, there is an advantage in that the filling density of the electrode can be increased, or the energy density per unit volume can be increased. Moreover, the powder particles of the lithium-metal complex oxide in the positive electrode active material according to the present invention, are measured by a pore distribution measurement using a nitrogen adsorption method, and the obtained mean volume of pores having a diameter of 40 nm or less in average, is between 0.001 cm$^3$/g and 0.008 cm$^3$/g. By keeping the contact volume within the electrolyte at 0.008 cm$^3$/g or less, deterioration of the active material due to reacting with the electrolyte at the time of cycle repetition can be kept to a minimum. By maintaining the pore volume at 0.001 cm³/g or more, the contact area with the electrolyte for obtaining a required output characteristic can be maintained. The mean volume of pores having a diameter of 40 nm or less in average is the mean value of measurement results for volumes of pores which have diameters of 40 nm or less in average for when the pore distribution measurement using the nitrogen adsorption method, is performed two times.

Furthermore, the mean crushing strength of the secondary particles is between 15 MPa and 100 MPa. By keeping the mean crushing strength at 15 MPa or more, at the time of electrode manufacturing, particles are not fractured. Therefore fine powders are unlikely to occur, and deterioration in cycle characteristics with excessive increase in the contact area with the electrolyte can be prevented. However, if the mean crushing strength becomes greater than 100 MPa, the pores become small. Therefore the contact area between the electrolyte and the positive electrode active material is decreased. Therefore, it becomes insufficient as a power supply for an electric vehicle, or a hybrid vehicle, or the like, that requires good output characteristics. The abovementioned mean crushing strength is for where a micro-compression tester is used to measure the individual crushing strengths for 20 pieces of secondary particles of diameters 10.0 μm approximately, and the mean value thereof is calculated.

In the abovementioned secondary particles, it is preferable that primary particles are mostly arranged radially from the center of the secondary particles. With the secondary particles having such a structure, compared to a case of forming the secondary particle with primary particles arranged in a random direction, at the time of expansion and contraction of the crystal during charge and discharge, the crystal is seldom crushed due to being arranged in a radial direction. Therefore, there is an advantage in that the cycle characteristics of the battery at the time of charging and discharging are improved.

Moreover, in the abovementioned lithium-metal complex oxide, on the 3a sites (the positions where the Li ions are to be arranged in a layered rock-salt structure of $LiNiO_2$,), it is preferable that the site occupancy of metal ions other than Li ion is 2% or less. If the site occupancy of metal ions other than Li is greater than 2%, diffusion paths of the Li ions are obstructed. Hence, in a battery using such a positive electrode active material, the initial capacitance or output characteristics are decreased, which is not desirable. The abovementioned site occupancy is obtained by Rietveld analysis of a powder X-ray diffraction pattern using Kα rays of Cu.

2. Manufacturing Method for a Positive Electrode Active Material for a Non-aqueous Electrolyte Secondary Battery A positive electrode active material according to the present invention will be described starting from the raw materials for the lithium-metal complex oxides. As the raw material for lithium, it is preferable to use a lithium hydroxide. As the raw materials for the other constituent elements, it is preferable to use a coprecipitated hydroxide of nickel and other additional metals (hereinafter, described as a coprecipitated hydroxide of nickel and the like).

Because the melting temperature of lithium hydroxide is low at 450° C., by mixing the lithium hydroxide with a coprecipitated hydroxide of nickel and the like and holding the compound within a temperature range between 450 and 550° C., the lithium hydroxide is melted. The melted lithium hydroxide soaks into the porous coprecipitated hydroxide of nickel and the like, and a synthesis reaction occurs, so that it becomes a lithium-metal complex oxide. Thus, by bringing about the synthesis reaction, even in the particles inside of the coprecipitated hydroxide of nickel and the like, the synthesis reaction can be uniformly induced.

Regarding the coprecipitated hydroxides of nickel and the like, there are for example, Ni—Co coprecipitated hydroxide, Ni—Co—Al coprecipitated hydroxide, Ni—Co—Ga coprecipitated hydroxide, and the like. Ni—Co coprecipitated hydroxide can be obtained by a method involving supplying sodium hydroxide and ammonia to an aqueous solution in which is dissolved a nickel sulfate and a cobalt sulfate, and crystallizing. Moreover, Ni—Co—Al coprecipitated hydroxide can be obtained by a method involving supplying sodium hydroxide and ammonia to an aqueous solution in which is dissolved a nickel sulfate, a cobalt sulfate and an aluminum sulfate, and crystallizing.

By using the coprecipitation method, additional elements can be mixed uniformly, and the bulk density of the raw material can be increased; and hence this is preferable. Moreover, in the obtained hydroxide, a plurality of the primary particles are aggregated to form the secondary particles, and the shape of the secondary particles is spherical or spheroidal. Therefore, by manufacturing a lithium-metal complex oxide with the hydroxide as the raw material, the powder particles of the obtained lithium-metal complex oxide become the secondary particles of spherical or spheroidal shape that are formed by aggregating the plurality of the primary particles of the lithium-metal complex oxide. A method of coprecipitating a nickel hydroxide at the same time as the coprecipitated hydroxides of nickel and the like can be used as well.

The tap density of the coprecipitated hydroxides of nickel and the like must be 1.7 g/cm³ or more. If the tap density is less than 1.7 g/cm³, the amount that can be placed into a baking container becomes decreased, and hence productivity is decreased. Moreover, the tap density of an obtained baked product falls below 2.2 g/cm³, and the filling property is decreased, so that the capacitance per volume of the battery is decreased, which is not preferable. In the case where the tap density of the coprecipitated hydroxide of nickel and the like is less than 1.7 g/cm³, it is considered that the coprecipitated hydroxide of nickel and the like is not spherical shaped, but becomes an aggregate with a low density.

Furthermore, as a raw material for the additional metals, compounds of the additional metals can also be used. For example, in the case of further adding Mg, this can be supplied by adding and mixing magnesium hydroxide or magnesium nitrate.

By mixing lithium hydroxide, a coprecipitated hydroxide of nickel and the like in which the tap density is 1.7 g/cm³ or more, and additional metal compounds, in specified quantities of each, so as to become a lithium-metal complex oxide which is represented by $Li_zNi_{1-w}M_wO_2$ (where, M is at least one kind or more of metal elements selected from the group consisting of Co, Al, Mg, Mn, Ti, Fe, Cu, Zn, and Ga; and w and z respectively satisfy $0<w\leq0.25$, and $1.0\leq z\leq1.1$), and performing a predetermined baking, a positive electrode active material according to the present invention can be obtained.

Next is a description regarding baking.

Baking is performed in two stages. At first, a first stage temperature rise with a temperature rise rate between 0.5 and 15° C./min is performed from room temperature to 450 to 550° C. being the first stage baking temperature, and it is held for 1 to 10 hours at the reaching temperature (the first stage baking temperature). Subsequently, a second stage temperature rise is performed to 650 to 800° C. being the second stage baking temperature, and it is held for 0.6 to 30 hours at the reaching temperature (tile second stage baking temperature). By this two stage baking, a positive electrode active material according to the present invention can be manufactured. After the two stage baking has been performed, the furnace is cooled.

As described above, because the melting temperature of lithium hydroxide is low at 450° C., by the first stage temperature rise, and by holding the compound of the lithium hydroxide and the coprecipitated hydroxide of nickel and the like within a temperature range between 450° C. and 550° C., the lithium hydroxide is melted. The melted lithium hydroxide soaks into the porous coprecipitated hydroxide of nickel and the like, and a synthesis reaction occurs, so that it becomes a lithium-metal complex oxide. Thus by bringing about the synthesis reaction, even in the particles inside of the coprecipitated hydroxide of nickel and the like, the synthesis reaction can be uniformly induced.

Moreover, in the case where a compound of lithium hydroxide and the coprecipitated hydroxide of nickel and the like are held within a temperature range between 450° C. and 550° C., the reaction temperature is low and the reaction slowly progresses. Therefore, to synthesis a lithium-nickel complex oxide that has a desirable layered structure, becomes relatively easy.

In the first stage temperature rise, the temperature rise may be performed from room temperature to 450 to 550° C. at a temperature rise rate of 15° C./min or less. By changing the temperature rise rate within a range between 0.5 and 15° C./min, then without hardly changing site occupancy rate of metal ions other than Li ions in the 3a sites in the layered rock-salt structure of a lithium nickelate ($LiNiO_2$), the mean crushing strength of the secondary particles can be changed. For example, when the main baking temperature is 750° C., by changing the first stage temperature rise rate within a range between 0.5 and 15° C./min, then without changing the site occupancy rate of metal ions other than Li in the 3a sites, the mean crushing strength of the secondary particles can be changed from 60 to 40 MPa level.

If the first stage temperature rise rate is slower than 0.5° C./min, a tendency for the particles to become hard appears, which is not preferable. Moreover, if it is faster than 15° C./min, the particles become too soft, which is not preferable.

The holding time at the first stage baking temperature (between 450 and 550° C.) must be 1 to 10 hours. If it is shorter than 1 hour, reaction is not sufficient. If it is longer than 10 hours, the melted lithium hydroxide is volatilized and soaks into a saggar containing the abovementioned compound. Therefore, neither is preferable.

The second stage temperature rise involves holding for 1 to 10 hours at the first baking temperature (between 450 and 550° C.), and then raising the temperature to the second stage baking temperature (between 650 and 800° C.), and holding at this baking temperature for 0.6 to 30 hours.

If the second stage baking temperature is lower than 650° C., reactions become insufficient, crystals are not grown, and on the 3a sites for the lithium site, the contamination rate of metal ions other than lithium is increased. If the second stage baking temperature exceeds 800° C., the layered structure become disordered, and the site occupancy rate of metal ions other than lithium on the 3a sites becomes larger than 2%. Hence, on the 3a sites being the lithium site, the contamination rate of metal ions other than lithium is increased. Furthermore, for example, lithium ions and nickel ions are mixed, and once cation mixing occurs, diffusion paths of the lithium ions are obstructed. Hence, for a battery using the positive electrode active material, the initial capacitance or output is decreased.

Therefore, the second stage baking temperature must be 650° C. or more and 800° C. or less. As a result, disorder of the crystal structure can be decreased. A more preferable second stage baking temperature is 680° C. or more and 780° C. or less. By making the baking temperature within this temperature range, a less disordered crystal structure can be realized.

Moreover, if the second stage baking temperature is increased to within a temperature range of 650° C. or more and 800° C. or less, the mean crushing strength of the secondary particles can be made small from 100 MPa to 30 MPa.

The second stage temperature rise rate is preferably between 1 and 5° C./min. If slower than 1° C./min, productivity becomes worse, which is not preferable, while if faster than 5° C./min, the temperature distribution of the baked product becomes large so that at each part of the baked product, variations in the synthesis reaction of the lithium complex hydroxide become large, which is not preferable.

The baking time under the present baking temperature is preferably from 0.6 to 30 hours. If shorter than 0.6 hour, the reaction between lithium and nickel does not sufficiently progress, which is not preferable. Moreover, if longer than 30 hours, productivity drops, which is not preferable.

The baking furnace used for the first stage baking and the second stage baking is not particularly limited. If it can be used in an oxygen atmosphere, it can be a continuous type furnace or a batch type furnace; and can be appropriately selected.

Moreover, the baking atmosphere may be any where oxygen is supplied sufficiently, and is more preferably an oxygen atmosphere.

In the above, a manufacturing method for a positive electrode active material according to the present invention has been described. However, as described above, in the baking of the first stage and the second stage, the fact that by adjusting the baking temperature and the temperature rise rate, the mean crushing strength of the secondary particles can be adjusted, is the characteristic of the manufacturing method according to the present invention.

Moreover, the mean crushing strength which defines the secondary particles in the positive electrode active material according to the present invention is for where, a microcompression tester is used to measure individual crushing strengths for 20 pieces of secondary particles of diameters 10.0 μm approximately, and a mean value thereof is calculated. Hence, the crushing strength of the secondary particles is accurately reflected. Therefore, if the mean crushing strength of the secondary particles is adjusted to be within a range between 15 and 100 MPa, then in the secondary particles, the mean volume of pores having a diameter of 40 nm or less, can be adjusted to within a range between 0.001 and 0.008 $cm^3/g$.

Furthermore, in the manufacturing method for a positive electrode active material according to the present invention, in the first stage baking and the second stage baking, by merely adjusting the baking temperature and the temperature rise rate, the positive electrode active material according to the present invention can be manufactured. Therefore, it can manufactured stably.

EXAMPLES

Example 1

In the $LiNiO_2$ complex oxide, $LiNi_{0.82}Co_{0.15}Al_{0.03}O_2$ was synthesized with 15 at % of Ni substituted by Co and 3 at % of Ni substituted by Al.

At first, sodium hydroxide and ammonia were supplied to an aqueous solution in which was dissolved nickel sulfate, cobalt sulfate, and aluminum sulfate, and by a coprecipitation method, a metal complex hydroxide in which nickel, cobalt and aluminum were present in the form of solid solution with a mole ratio of 82:15:3, was manufactured. The metal complex hydroxide comprised spherical secondary particles, in which a plurality of primary particles with diameters of 1 µm or less, were aggregated. A tap density of the obtained metal complex hydroxide was 1.72 g/cm$^3$.

The metal complex hydroxide and a commercial lithium hydroxide monohydrate (manufactured by FMC Corporation) were weighed so that the ratio of the total number of moles of metals (Ni, Co, and Al) other than Li, and the number of moles of Li became 1:1. Then they were sufficiently mixed using a blender (SPARTAN-RYUZER manufactured by Fuji Paudal Co., Ltd.). Then the temperature was raised at a temperature rise rate of 5° C./min, and the mixture was provisionally baked at 450° C. for 2 hours in an oxygen atmosphere. Subsequently the temperature was raised at a temperature rise rate of 3° C./min, and the mixture was main baked at 650° C. for 20 hours. The furnace was then cooled to room temperature. Table 1 shows the manufacturing conditions.

By an X-ray diffraction analysis of the obtained baked product it could be confirmed that this was a desirable positive electrode active material having a hexagonal layered structure. 95% or more of the particles of the obtained baked product had a particle diameter of 20 µm or less, and the mean particle diameter was approximately 7.81 µm. Moreover, the tap density of the obtained baked product was 2.32 g/cm$^3$.

Furthermore, a mean volume of pores having a diameter of 40 nm or less in average was measured by a nitrogen adsorption method. The mean volume of pores having a diameter of 40 nm or less in average was, at the time of performing the pore distribution measurement two times using the nitrogen adsorption method, the mean value of measurement results of volumes of pores having a diameter of 40 nm or less in average. Furthermore, from a Rietveld analysis of a powder X-ray diffraction pattern using Kα rays of Cu, a contamination rate of metal ions other than Li on the 3a sites was obtained.

Regarding the obtained powders, by using a micro-compression tester (manufactured by Shimadzu Corporation), the crushing strength of each of 20 secondary particles with diameters of 10.0 µm approximately was measured, and the mean value was calculated as the mean crushing strength. The results are shown in Table 2, together with the mean volume of pores having a diameter of 40 nm or less, and the contamination rate of metal ions other than Li on the 3a site.

An evaluation of a cycle characteristics of charge and discharge, and output, of a battery using a positive electrode active material according to the present invention, was performed as described below. An electroconductive material comprising; an obtained positive electrode active material for a non-aqueous electrolyte secondary battery, carbon black, and a binding agent made from polyvinylidene fluoride (PVDF), were mixed at a mass ratio of 85:10:5, and then dissolved into a N-methyl-2-pyrolidone (NMP) solution, to manufacture a positive electrode active material paste. The obtained paste was coated on both sides of an aluminum foil using a comma coater, then heated to 100° C. and dried to obtain the positive electrode. The positive electrode was passed through a roll pressing machine and subjected to a load, so that an electrode sheet, with improved electrode density was manufactured.

Subsequently, a negative electrode active material made from carbon black, and PVDF as a binding agent, were dissolved at a mass ratio of 92.5:7.5 in an NMP solution, and a negative electrode active material paste was obtained. The obtained negative electrode active material paste, similar to the positive electrode, was coated on both sides of an aluminum foil using a comma coater, then dried at 120° C. to obtain the negative electrode. The negative electrode was passed through a roll pressing machine and subjected to a load, so that a negative electrode sheet with improved electrode density was manufactured.

The obtained positive electrode sheet and negative electrode sheet were then rolled up in a condition with a separator comprising a microporous polyethylene sheet of thickness 25 µm therebetween, to form a roll type electrode body. Then in a condition with lead tabs respectively provided on the positive electrode sheet and the negative electrode sheet, connected to the positive electrode terminal and the negative electrode terminal, the roll type electrode body was inserted into the inside of a battery case.

The electrolyte was adjusted by dissolving LiPF$_6$ as a lithium salt in an organic solvent comprising a mixed solution of ethylene carbonate (EC) and diethylene carbonate (DEC) mixed at a volume ratio of 3:7, so as to be 1 mol/dm$^3$ in the electrolyte.

The obtained electrolyte was poured into the battery case, in which the roll type electrode body was inserted, and an opening part of the battery case was closed and the battery case sealed. By the above, the lithium ion secondary battery was manufactured using the positive electrode active material for a non-aqueous electrolyte secondary battery as shown in the examples and the comparative examples. Using this battery, an evaluation of the cycle characteristics, and measurement of the output was performed. For the cycle characteristics, an evaluation was performed by a ratio of initial discharge capacity to discharge capacity after repeating charging and discharging for 500 cycles at 25° C., at a cut-off voltage: 4.1 V to 3.0 V, and a current density: 0.5 mA/cm$^2$. The method for the output characteristics involved performing charging until the charging depth became 40%, then setting the battery inside a thermostatic chamber at a temperature of −30° C. and passing a pulse current for 10 seconds, and obtaining the low temperature output from the current value for when the voltage was reduced to 3V. The results are shown in Table 2.

Example 2

Other than the main bake temperature being 750° C., LiNi$_{0.82}$Co$_{0.15}$Al$_{0.03}$O$_2$ was synthesized by the same method as for example 1. Table 1 shows the processing conditions.

By an X-ray diffraction analysis of the obtained baked product it could be confirmed that this was a desirable positive electrode active material having a hexagonal layered structure. 95% or more of the particles of the obtained baked product had a particle diameter of 20 µm or less, and the mean particle diameter was approximately 8.36 µm. Moreover, the tap density of the obtained baked product was 2.34 g/cm$^3$.

In the same manner as in example 1, Rietveld analysis, measurement of the mean crushing strength, measurement of the mean volume of pores having a diameter of 40 nm or less, and battery evaluation were performed. The results are shown in Table 2.

Example 3

Other than the holding time at the provisional bake temperature (450° C.) being 1 hour, LiNi$_{0.82}$Co$_{0.15}$Al$_{0.03}$O$_2$ was synthesized by the same method as for example 2. Table 1 shows the processing conditions.

By an X-ray diffraction analysis of the obtained baked product it could be confirmed that this was a desirable positive electrode active material having a hexagonal layered structure. 95% or more of the particles of the obtained baked product had a particle diameter of 20 µm or less, and the mean particle diameter was 8.43 µm. Moreover, the tap density of the obtained baked product was 2.42 g/cm$^3$.

In the same manner as in example 1, Rietveld analysis and measurement of the mean crushing strength, measurement of the mean volume of pores having a diameter of 40 nm or less, and battery evaluation were performed. The results are shown in Table 2.

Example 4

Other than the holding time at the provisional bake temperature (450° C.) being 10 hour, $LiNi_{0.82}Co_{0.15}Al_{0.03}O_2$ was synthesized by the same method as for example 2. Table 1 shows the processing conditions.

By an X-ray diffraction analysis of the obtained baked product it could be confirmed that this was a desirable positive electrode active material having a hexagonal layered structure. 95% or more of the particles of the obtained baked product had a particle diameter of 20 µm or less, and the mean particle diameter was 8.23 µm. Moreover, the tap density of the obtained baked product was 2.33 g/cm$^3$.

In the same manner as in example 1, Rietveld analysis and measurement of the mean crushing strength, measurement of the mean volume of pores having a diameter of 40 nm or less, and battery evaluation were performed. The results are shown in Table 2.

Example 5

Other than the main bake temperature being 850° C., $LiNi_{0.82}Co_{0.15}Al_{0.03}O_2$ was synthesized by the same method as for example 1. Table 1 shows the processing conditions.

By an X-ray diffraction analysis of the obtained baked product it could be confirmed that this was a desirable positive electrode active material having a hexagonal layered structure. 95% or more of the particles of the obtained baked product had a particle diameter of 20 µm or less, and the mean particle diameter was 9.21 µm. Moreover, the tap density of the obtained baked product was 2.39 g/cm$^3$.

In the same manner as in example 1, Rietveld analysis, measurement of the mean crushing strength, measurement of the mean volume of pores having a diameter of 40 nm or less, and battery evaluation were performed. The results are shown in Table 2.

Example 6

Other than the temperature rise rate to the provisional bake temperature (450° C.) being 1° C./min, $LiNi_{0.82}Co_{0.15}Al_{0.03}O_2$ was synthesized by the same method as for example 2. Table 1 shows the processing conditions.

By an X-ray diffraction analysis of the obtained baked product it could be confirmed that this was a desirable positive electrode active material having a hexagonal layered structure. 95% or more of the particles of the obtained baked product had a particle diameter of 20 µm or less, and the mean particle diameter was 8.27 µm. Moreover, the tap density of the obtained baked product was 2.32 g/cm$^3$.

In the same manner as in example 1, Rietveld analysis, measurement of the mean crushing strength, measurement of the mean volume of pores having a diameter of 40 nm or less, and battery evaluation were performed. The results are shown in Table 2.

Example 7

Other than the temperature rise rate to the provisional bake temperature (450° C.) being 15° C./min, $LiNi_{0.82}Co_{0.15}Al_{0.03}O_2$ was synthesized by the same method as for example 2. Table 1 shows the processing conditions.

By an X-ray diffraction analysis of the obtained baked product it could be confirmed that this was a desirable positive electrode active material having a hexagonal layered structure. 95% or more of the particles of the obtained baked product had a particle diameter of 20 µm or less, and the mean particle diameter was 8.32 µm. Moreover, the tap density of the obtained baked product was 2.34 g/cm$^3$.

In the same manner as in example 1, Rietveld analysis, measurement of the mean crushing strength, measurement of the mean volume of pores having a diameter of 40 nm or less, and battery evaluation were performed. The results are shown in Table 2.

Example 8

Other than the provisional bake temperature being 550° C., $LiNi_{0.82}Co_{0.15}Al_{0.03}O_2$ was synthesized by the same method as for example 2. Table 1 shows the processing conditions.

By an X-ray diffraction analysis of the obtained baked product it could be confirmed that this was a desirable positive electrode active material having a hexagonal layered structure. 95% or more of the particles of the obtained baked product had a particle diameter of 20 µm or less, and the mean particle diameter was 8.13 µm. Moreover, the tap density of the obtained baked product was 2.33 g/cm$^3$.

In the same manner as in example 1, Rietveld analysis, measurement of the mean crushing strength, measurement of the mean volume of pores having a diameter of 40 nm or less, and battery evaluation were performed. The results are shown in Table 2.

Example 9

Other than the holding time at the main bake temperature (750° C.) being 1 hour, $LiNi_{0.82}Co_{0.15}Al_{0.03}O_2$ was synthesized by the same method as for example 2. Table 1 shows the processing conditions.

By an X-ray diffraction analysis of the obtained baked product it could be confirmed that this was a desirable positive electrode active material having a hexagonal layered structure. 95% or more of the particles of the obtained baked product had a particle diameter of 20 µm or less, and the mean particle diameter was 7.01 µm. Moreover, the tap density of the obtained baked product was 2.20 g/cm$^3$.

In the same manner as in example 1, Rietveld analysis, measurement of the mean crushing strength, measurement of the mean volume of pores having a diameter below 40 nm, and battery evaluation were performed. The results are shown in Table 2.

Comparative Examples 1 and 2

Other than the main bake temperature being 600° C. (comparative example 1), and 850° C. (comparative example 2), $LiNi_{0.82}Co_{0.15}Al_{0.03}O_2$ was synthesized by the same method as for example 1. Table 1 shows the processing conditions.

By an X-ray diffraction analysis of the obtained baked product it could be confirmed that this was a desirable positive electrode active material having a hexagonal layered structure. 95% or more of the particles of the baked product of comparative example 1 had a particle diameter of 20 μm or less, and the mean particle diameter was 6.99 μm. Moreover, the tap density was 2.32 g/cm$^3$. 95% or more of the particles of the baked product of comparative example 2 had a particle diameter of 20 μm or less, and the mean particle diameter was 9.35 μm. Moreover, the tap density was 2.42 g/cm$^3$.

In the same manner as in example 1 for each, Rietveld analysis, measurement of the mean crushing strength, measurement of the mean volume of pores having a diameter of 40 nm or less, and battery evaluation were performed. The results are shown in Table 2.

Comparative Examples 3 and 4

Other than the temperature rise rate to the provisional bake temperature (450° C.) being 0.3° C./min (comparative example 3) and 16° C./min (comparative example 4), LiNi$_{0.82}$Co$_{0.15}$Al$_{0.03}$O$_2$ was synthesized by the same method as for example 2. Table 1 shows the processing conditions.

By an X-ray diffraction analysis of the obtained baked product it could be confirmed that this was a desirable positive electrode active material having a hexagonal layered structure. 95% or more of the particles of the baked product of comparative example 3 had a particle diameter of 20 μm or less, and the mean particle diameter was 8.01 μm. Moreover, the tap density was 2.40 g/cm$^3$. 95% or more of the particles of the baked product of comparative example 4 had a particle diameter of 20 μm or less, and the mean particle diameter was 8.06 μm. Moreover, the tap density was 2.31 g/cm$^3$.

In the same manner as in example 1, Rietveld analysis, measurement of the mean crushing strength, measurement of the mean volume of pores having a diameter of 40 nm or less, and battery evaluation were performed. The results are shown in Table 2.

Comparative Examples 5 and 6

Other than the holding time at the provisional bake temperature (450° C.) being 0.8 hours (comparative example 5) and 11 hours (comparative example 6), LiNi$_{0.82}$Co$_{0.15}$Al$_{0.03}$O$_2$ was synthesized by the same method as for example 2. Table 1 shows the processing conditions.

By an X-ray diffraction analysis of the obtained baked product it could be confirmed that this was a desirable positive electrode active material having a hexagonal layered structure. 95% or more of the particles of the baked product of comparative example 5 had a particle diameter of 20 μm or less, and the mean particle diameter was 8.33 μm. Moreover, the tap density was 2.38 g/cm$^3$. 95% or more of the particles of the baked product of comparative example 6 had a particle diameter of 20 μm or less, and the mean particle diameter was 8.87 μm. Moreover, the tap density was 2.44 g/cm$^3$.

In the same manner as in example 1, Rietveld analysis, measurement of the mean crushing strength, measurement of the mean volume of pores having a diameter of 40 nm or less, and battery evaluation were performed. The results are shown in Table 2.

Comparative Examples 7 and 8

Other than the provisional bake temperature being 440° C. (comparative example 7) and 570° C. (comparative example 8), LiNi$_{0.82}$Co$_{0.15}$Al$_{0.03}$O$_2$ was synthesized by the same method as for example 2. Table 1 shows the processing conditions.

By an X-ray diffraction analysis of the obtained baked product it could be confirmed that this was a desirable positive electrode active material having a hexagonal layered structure. 95% or more of the particles of the baked product of comparative example 7 had a particle diameter of 20 μm or less, and the mean particle diameter was 8.22 μm. Moreover, the tap density was 2.38 g/cm$^3$. 95% or more of the particles of the baked product of comparative example 8 had a particle diameter of 20 μm or less, and the mean particle diameter was 8.31 μm. Moreover, the tap density was 2.33 g/cm$^3$.

In the same manner as in example 1, Rietveld analysis, measurement of the mean crushing strength, measurement of the mean volume of pores having a diameter of 40 nm or less, and battery evaluation were performed. The results are shown in Table 2.

Comparative Example 9

Other than the holding time at the main bake temperature of 750° C. being 0.5 hours, LiNi$_{0.82}$Co$_{0.15}$Al$_{0.03}$O$_2$ was synthesized by the same method as for example 2. Table 1 shows the processing conditions.

By an X-ray diffraction analysis of the obtained baked product it could be confirmed that this was a desirable positive electrode active material having a hexagonal layered structure. 95% or more of the particles of the obtained baked product had a particle diameter of 20 μm or less, and the mean particle diameter was 8.06 μm. Moreover, the tap density of the obtained baked product was 2.34 g/cm$^3$.

In the same manner as in example 1, Rietveld analysis, measurement of the mean crushing strength, measurement of the mean volume of pores having a diameter of 40 nm or less, and battery evaluation were performed. The results are shown in Table 2.

Comparative Example 10

In order to synthesize LiNi$_{0.82}$Co$_{0.15}$Al$_{0.03}$O$_2$, with 15 at % of Ni substituted for Co and 3 at % of Ni substituted for Al, a metal complex hydroxide comprised of spherical secondary particles in which a plurality of primary particles with diameters of 1 μm or less were aggregated, and in which a mole ratio of nickel, cobalt, and aluminum was made 82:15:3 in solution, was manufactured by a coprecipitation method with the pH of the solution adjusted. The tap density of the obtained metal complex hydroxide was 1.60 g/cm$^3$.

Other than using the metal complex hydroxide, LiNi$_{0.82}$Co$_{0.15}$Al$_{0.03}$O$_2$ was synthesized by the same method as for example 2. Table 1 shows the processing conditions.

By an X-ray diffraction analysis of the obtained baked product it could be confirmed that this was a desirable positive electrode active material having a hexagonal layered structure. 95% or more of the particles of the obtained baked product had a particle diameter of 20 μm or less, and the mean particle diameter was 6.21 μm. Moreover, the tap density of the obtained baked product was 2.10 g/cm$^3$.

In the same manner as in example 1, Rietveld analysis, measurement of the mean crushing strength, measurement of the mean volume of pores having a diameter of 40 nm or less, and battery evaluation were performed. The results are shown in Table 2.

Comparative Example 11

Other than holding for 2 hours at the provisional bake temperature (450° C.), and then raising the temperature to the main bake temperature (750° C.) at a temperature rise rate of 0.7° C./min, $LiNi_{0.82}Co_{0.15}Al_{0.03}O_2$ was synthesized by the same method as for example 2. Table 1 shows the processing conditions.

By an X-ray diffraction analysis of the obtained baked product it could be confirmed that this was a desirable positive electrode active material having a hexagonal layered structure. 95% or more of the particles of the obtained baked product had a particle diameter of 20 μm or less, and the mean particle diameter was 8.32 μm. Moreover, the tap density of the obtained baked product was 2.39 g/cm³.

In the same manner as in example 1, Rietveld analysis, measurement of the mean crushing strength, measurement of the mean volume of pores having a diameter of 40 nm or less, and battery evaluation were performed. The results are shown in Table 2.

Comparative Example 12

By increasing the ammonia concentration and reaction pH above those of the conditions for manufacturing the raw material hydroxide according to the present invention, and extending the reaction time to thereby grow the secondary particles, a raw material hydroxide in which 6% of the particles had a diameter of 20 μm or more was manufactured. Using this raw material hydroxide, $LiNi_{0.82}Co_{0.15}Al_{0.03}O_2$ was synthesized by the same method as for example 2. By an X-ray diffraction analysis of the obtained baked product it could be confirmed that this was a desirable positive electrode active material having a hexagonal layered structure. 94% of the particles of the obtained baked product had a particle diameter of 20 μm or less, and the mean particle diameter was 13.40 μm. Moreover, the tap density of the obtained baked product was 2.54 g/cm³.

In the same manner as in example 1, Rietveld analysis, measurement of the mean crushing strength, measurement of the mean volume of pores having a diameter of 40 nm or less, and battery evaluation were performed. The results are shown in Table 2.

Comparative Example 13

Other than supplying only sodium hydroxide to an aqueous solution in which was dissolved nickel sulfate, cobalt sulfate and aluminum sulfate, and coprecipitating without supplying ammonia, a raw material hydroxide was manufactured in the same manner as in example 2, giving a raw material hydroxide in which the secondary particles had not become spherical but were aggregated in a flocculant of 5 μm approximately. Using the raw material hydroxide, $LiNi_{0.82}Co_{0.15}Al_{0.03}O_2$ was synthesized by the same method as for example 2. By an X-ray diffraction analysis of the obtained baked product it could be confirmed that this was a desirable positive electrode active material having a hexagonal layered structure. 95% or more of the particles of the obtained baked product had a particle diameter of 20 μm or less, and the mean particle diameter was 6.34 μm. Moreover, the tap density of the obtained baked product was 1.58 g/cm³.

In the same manner as in example 1, Rietveld analysis, measurement of the mean crushing strength, measurement of the mean volume of pores having a diameter of 40 nm or less, and battery evaluation were performed. The results are shown in Table 2.

TABLE 1

| | Hydroxide tap density (g/cm³) | Temp. rise rate (° C./min) | First stage baking temp. (° C.) | Holding time for first stage baking (h) | Temp. rise rate (° C./min) | Second stage baking temp. (° C.) | Holding time for second stage baking (h) |
|---|---|---|---|---|---|---|---|
| Example 1 | 1.82 | 5 | 450 | 2 | 3 | 650 | 20 |
| Example 2 | 1.82 | 5 | 450 | 2 | 3 | 750 | 20 |
| Example 3 | 1.82 | 5 | 450 | 1 | 3 | 750 | 20 |
| Example 4 | 1.82 | 5 | 450 | 10 | 3 | 750 | 20 |
| Example 5 | 1.82 | 5 | 450 | 2 | 3 | 800 | 20 |
| Example 6 | 1.82 | 1 | 450 | 2 | 3 | 750 | 20 |
| Example 7 | 1.82 | 15 | 450 | 2 | 3 | 750 | 20 |
| Example 8 | 1.82 | 5 | 550 | 2 | 3 | 750 | 20 |
| Example 9 | 1.70 | 5 | 450 | 2 | 3 | 750 | 1 |
| CE 1 | 1.82 | 5 | 450 | 2 | 3 | 600 | 20 |
| CE 2 | 1.82 | 5 | 450 | 2 | 3 | 850 | 20 |
| CE 3 | 1.82 | 0.3 | 450 | 2 | 3 | 750 | 20 |
| CE 4 | 1.82 | 16 | 450 | 2 | 3 | 750 | 20 |
| CE 5 | 1.82 | 5 | 450 | 0.8 | 3 | 750 | 20 |
| CE 6 | 1.82 | 5 | 450 | 11 | 3 | 750 | 20 |
| CE 7 | 1.82 | 5 | 440 | 2 | 3 | 750 | 20 |
| CE 8 | 1.82 | 5 | 570 | 2 | 3 | 750 | 20 |
| CE 9 | 1.82 | 5 | 450 | 2 | 3 | 750 | 0.5 |
| CE 10 | 1.60 | 5 | 450 | 2 | 3 | 750 | 20 |
| CE 11 | 1.82 | 5 | 450 | 2 | 0.7 | 750 | 20 |
| CE 12 | 1.95 | 5 | 450 | 2 | 3 | 750 | 20 |
| CE 13 | 0.78 | 5 | 450 | 2 | 3 | 750 | 20 |

(*) CE = Comparative Example

TABLE 2

|  | Proportion of particles with particle diameter 20 μm or more | Mean particle diameter (μm) | Shape | Tap density (cm³) | Pore mean volume (cm³/g) | Crushing strength (MPa) | 3a site occupancy rate (%) | Initial discharge capacity (mAh/g) | Cycle characteristics (%) | Output (W) |
|---|---|---|---|---|---|---|---|---|---|---|
| Example 1 | 5% or less | 7.81 | Spherical | 2.32 | 0.0015 | 98.3 | 1.9 | 166.4 | 90.3 | 3.33 |
| Example 2 | 5% or less | 8.36 | Spherical | 2.34 | 0.0032 | 49.3 | 1.3 | 170.1 | 89.7 | 3.54 |
| Example 3 | 5% or less | 8.43 | Spherical | 2.42 | 0.0038 | 47.2 | 1.3 | 168.5 | 89.2 | 3.22 |
| Example 4 | 5% or less | 8.23 | Spherical | 2.33 | 0.0041 | 50.2 | 1.9 | 165.3 | 89.1 | 3.28 |
| Example 5 | 5% or less | 9.21 | Spherical | 2.39 | 0.0051 | 29.4 | 1.7 | 167.5 | 89.2 | 3.15 |
| Example 6 | 5% or less | 8.27 | Spherical | 2.32 | 0.0011 | 71.3 | 1.3 | 168.8 | 89.9 | 3.23 |
| Example 7 | 5% or less | 8.32 | Spherical | 2.34 | 0.0069 | 20.4 | 1.3 | 168.9 | 89.1 | 3.86 |
| Example 8 | 5% or less | 8.13 | Spherical | 2.33 | 0.0018 | 42.3 | 1.4 | 168.2 | 89.9 | 3.66 |
| Example 9 | 5% or less | 7.01 | Spherical | 2.20 | 0.0036 | 51.3 | 1.3 | 168.6 | 89.2 | 3.38 |
| CE 1 | 5% or less | 7.98 | Spherical | 2.32 | 0.0008 | 105.2 | 3.3 | 151.2 | 86.1 | 2.14 |
| CE 2 | 5% or less | 9.35 | Spherical | 2.42 | 0.0113 | 11.4 | 2.8 | 154.3 | 86.9 | 2.38 |
| Ce 3 | 5% or less | 8.01 | Spherical | 2.40 | 0.0009 | 112.6 | 1.3 | 168.3 | 89.2 | 2.92 |
| CE 4 | 5% or less | 8.06 | Spherical | 2.31 | 0.0082 | 13.8 | 1.4 | 167.9 | 87.1 | 3.78 |
| CE 5 | 5% or less | 8.33 | Spherical | 2.38 | 0.0072 | 41.9 | 2.3 | 156.3 | 87.3 | 2.36 |
| CE 6 | 5% or less | 8.87 | Spherical | 2.44 | 0.0035 | 58.3 | 2.1 | 157.3 | 88.2 | 2.88 |
| CE 7 | 5% or less | 8.22 | Spherical | 2.38 | 0.0061 | 35.9 | 2.2 | 156.6 | 88.1 | 2.43 |
| CE 8 | 5% or less | 8.31 | Spherical | 2.33 | 0.0076 | 30.2 | 2.1 | 157.2 | 88.1 | 2.56 |
| CE 9 | 5% or less | 8.06 | Spherical | 2.34 | 0.0048 | 61.3 | 2.4 | 155.8 | 87.5 | 2.48 |
| CE 10 | 5% or less | 6.21 | Spherical | 2.10 | 0.004 | 63.5 | 1.3 | 168.7 | 88.5 | 3.42 |
| CE 11 | 5% or less | 8.32 | Spherical | 2.39 | 0.0009 | 102.9 | 1.4 | 164.7 | 89.1 | 2.95 |
| CE 12 | 6% | 13.4 | Spherical | 2.54 | 0.0041 | 32.3 | 1.3 | 162.5 | 89.5 | 2.88 |
| CE 13 | 5% or less | 6.34 | Flocculent | 1.58 | 0.0002 | NM | 1.3 | 168.9 | 86.0 | 3.86 |

(*) CE = Comparative Example, NM = Not measurable

Examples 1 to 9

For examples 1 to 9, the processing conditions are within the range of the manufacturing method of the present invention. For the obtained positive electrode active materials, the compositions, particle diameters, shapes, tap densities, mean volumes of pores having a diameter of 40 nm or less, and mean crushing strengths are within the range of those of the positive electrode active materials of the present invention.

In examples 1 to 9, the mean crushing strength is between 20.4 and 98.3 MPa, and the mean volume of pores having a diameter of 40 nm or less is between 0.0011 and 0.0069 cm³/g. Therefore, by controlling the mean crushing strength to within a range between 15 and 100 MPa, the mean volume of pores having a diameter of 40 nm or less can be controlled to within a range between 0.001 and 0.008 cm³/g.

According to the results, the properties of the secondary battery manufactured using the positive electrode active materials according to examples 1 to 9 are excellent. The initial discharge capacity is 165 mAh/g or more, the cycle characteristics are 89% or more, and the output is 3 W or more.

"Influence of Temperature Rise Rate Up to First Stage Baking Temperature, and Baking Temperature of Second Step"

In example 6 and comparative example 3 in which the temperature rise rates up to the first stage baking temperature are small at (1° C./min) and (0.3° C./min) respectively, the mean volumes of pores become small to 0.0011 cm³/g and 0.0009 cm³/g respectively. Furthermore, the mean crushing strengths become large to 71.3 MPa and 112.6 MPa respectively. In contrast, in example 7 and comparative example 4 in which the temperature rise rates up to the first stage baking temperature are large at (15° C./min) and (16° C./min) respectively, the mean volumes of pores become large to 0.0069 cm³/g and 0.0082 cm³/g respectively. Furthermore, the mean crushing strengths become small to 20.4 MPa. and 13.8 MPa respectively. Consequently, it is seen that if the temperature rise rate to the first stage baking temperature is increased, the mean volume of pores having a diameter of 40 nm or less is increased, and the crushing strength is reduced.

In example 1 and comparative example 1 in which the second stage baking temperatures are low at (650° C.) and (600° C.) respectively, the mean volumes of pores become small to 0.0015 cm³/g and 0.0008 cm³/g respectively. Furthermore, the mean crushing strengths become large to 98.3 MPa and 105.2 MPa respectively. In contrast, in example 5 and comparative example 2 in which the second stage baking temperatures are high at (800° C.) and (850° C.) respectively, the mean volumes of pores become large to 0.0051 cm³/g and 0.0113 cm³/g respectively. Furthermore, the mean crushing strengths become small to 29.4 MPa and 11.4 MPa respectively. Consequently, it is seen that if the second stage baking temperature is increased, the mean volume of pores having a diameter of 40 nm or less is increased, and the crushing strength is reduced.

Therefore, by appropriately selecting the temperature rise rate up to the first stage baking temperature, and the second stage baking temperature, the mean crushing strength of the secondary particles can be controlled to between 15 and 100 MPa. Furthermore, the mean volume of pores having a diameter of 40 nm or less can be controlled to between 0.001 and 0.008 cm³/g. Hence, a positive electrode active material for a non-aqueous electrolyte secondary battery, that is also superior in battery characteristics can be provided.

Comparative Examples 1 to 13

In comparative example 1, the second stage baking temperature is low at 600° C., falling below the lower limit of 650° C. for the main baking temperature of the manufacturing method according to the present invention. Therefore, the mean crushing strength of the secondary particles of the obtained lithium-metal complex oxide becomes large to 105.2 MPa, rising above the upper limit of 100 MPa for the mean crushing strength of the positive electrode active material according to the present invention. Therefore, the mean volume of pores having a diameter of 40 nm or less becomes small to 0.0008 cm$^3$/g, falling below the lower limit of 0.001 cm$^3$/g for the mean volume of pores having a diameter of 40 nm or less, of the positive electrode active material according to the present invention. If the mean volume becomes small, the contact area with the electrolyte becomes small, and the output characteristics are worsened. Moreover, in the case where the second stage baking temperature is low at 600° C., there was also a problem that the reaction is not progressed sufficiently. Furthermore, the site occupancy rate of metal ions other than Li on the 3a sites is large at 3.3%, excessively exceeding the upper limit of 2% as the preferable range in the present invention. Hence, battery characteristics such as the initial discharge capacity, the cycle characteristics, and the output characteristics of a secondary battery, are worsened.

In comparative example 2, the second stage baking temperature is high at 850° C., rising above the upper limit of 800° C. for the second stage baking temperature of the manufacturing method according to the present invention. Therefore, the mean crushing strength of the secondary particles of the obtained lithium-metal complex oxide becomes small to 11.4 MPa, falling below the lower limit of 15 MPa for the mean crushing strength of the positive electrode active material according to the present invention. Therefore, the mean volume of pores having a diameter of 40 nm or less becomes large to 0.0113 cm$^3$/g, rising above the upper limit of 0.008 cm$^3$/g for the mean volume of pores having a diameter of 40 nm or less, of the positive electrode active material according to the present invention. This shows that primary particles have grown and grain boundaries decreased, so that when a pressure is applied, the force per one grain boundary is increased, and the grains are easily crushed. Moreover, it is considered that due to the decreased grain boundary, the pores gather together and become large, and hence the mean volume of pores having a diameter of 40 nm or less, is increased. Furthermore, the site occupancy rate of metal ions other than Li on the 3a sites is large at 2.8%, which excessively exceeds the upper limit of 2% for the preferable range in the present invention. Hence, the battery characteristics such as the initial discharge capacity, the cycle characteristics, and the output characteristics of a secondary battery, are worsened.

In comparative example 3, the temperature rise rate up to the first stage baking temperature is small at 0.3° C./min, falling below the lower limit of 0.5° C./min for the temperature rise rate up to the first stage baking temperature of the manufacturing method according to the present invention. Therefore, the mean crushing strength becomes large to 112.6 MPa, rising above the upper limit of 100 MPa for the mean crushing strength of the positive electrode active material according to the present invention. Therefore, a mean volume of pores having a diameter below 40 nm becomes small to 0.0009 cm$^3$/g, falling below the lower limit of 0.001 cm$^3$/g for the mean volume of pores having a diameter of 40 nm or less, of the positive electrode active material according to the present invention. Therefore the contact area with the electrolyte becomes small, and the output characteristics are worsened.

In comparative example 4, the temperature rise rate up to the first stage baking temperature is large at 16° C./min, rising above the upper limit of 15° C./min for the temperature rise rate up to the first stage baking temperature of the manufacturing method according to the present invention. Therefore, the mean crushing strength becomes small to 13.8 MPa, falling below the lower limit of 15 MPa for the mean crushing strength of the positive electrode active material according to the present invention. Therefore, a mean volume of pores having a diameter of 40 nm or less becomes large to 0.0082 cm$^3$/g, rising above the upper limit of 0.008 cm$^3$/g for the mean volume of pores of the positive electrode active material according to the present invention. Therefore the contact area with the electrolyte becomes large, and the cycle characteristics of the battery are worsened.

In comparative example 5, the holding time at the first stage baking temperature is short at 0.8 hours, falling below the lower limit of 1 hour for the holding time of the first stage baking of the manufacturing method according to the present invention. Therefore, the site occupancy of metal ions other than lithium on the 3a sites becomes 2.1%, rising above the upper limit of 2% for the preferred range of the present invention. Hence, the battery characteristics such as the initial discharge capacity, the cycle characteristics, and the output characteristics of a secondary battery, are worsened.

In comparative example 6, the holding time at the first stage baking temperature is long at 11 hours, rising above the upper limit of 10 hours for the holding time of the first stage baking of the manufacturing method according to the present invention. Therefore, the melted lithium hydroxide is volatilized and soaked into a saggar containing the abovementioned compound, so that the lithium hydroxide is decreased, and reactions became insufficient; which was not preferable. Moreover, the site occupancy rate of metal ions other than lithium on the 3a sites becomes 2.1%, rising above the upper limit of 2% for the preferred range of the present invention. Hence, the battery characteristics such as the initial discharge capacity of a secondary battery, the cycle characteristics, and the output characteristics, are worsened.

In comparative example 7, the first stage baking temperature is low at 440° C., falling below the lower limit of 450° C. for the first stage baking temperature of the manufacturing method according to the present invention. Therefore, reactions become insufficient; and the site occupancy rate of metal ions other than lithium on the 3a sites becomes 2.2%, rising above the upper limit of 2% for the preferred range of the present invention. Hence, the battery characteristics such as the initial discharge capacity, the cycle characteristics, and the output characteristics of a secondary battery, are worsened.

In comparative example 8, the first stage baking temperature is high at 570° C., rising above the upper limit of 550° C. for the first stage baking temperature of the manufacturing method according to the present invention. Therefore, reactions become insufficient; and the site occupancy rate of metal ions other than lithium on the 3a sites becomes 2.1%, rising above the upper limit of 2% for the preferred range of the present invention. Hence, the battery characteristics such as the initial discharge capacity, the cycle characteristics, and the output characteristics of a secondary battery, are worsened.

In comparative example 9, the holding time at the second stage baking temperature is 0.5 hours, falling below the lower limit of 1 hour for the holding time of the main baking of the manufacturing method according to the present invention. Therefore, the reactions become insufficient; and the site occupancy rate of metal ions other than lithium on the 3a sites becomes 2.4%, rising above the upper limit of 2% for the preferred range for the positive electrode active material according to the present invention. Hence, battery characteristics such as the initial discharge capacity, the cycle characteristics, and the output characteristics of a secondary battery, are worsened.

In comparative example 10, the tap density of the metal complex hydroxide containing Ni, Co and Al as the hydroxide materials, is low at 1.60 g/cm$^3$. Hence, the tap density of the metal complex hydroxide to be used falls below the lower limit of 1.70 g/cm³ in the manufacturing method according to the present invention. Therefore, the tap density of the obtained positive electrode active material is low at 2.10 g/cm³, falling below the lower limit of 2.20 g/cm³ for the tap density of the positive electrode active material according to the present invention. Hence the electrode density for when used as the positive electrode, falls and the cycle characteristics are worsened.

In comparative example 11, the temperature rise rate from the first stage baking temperature to the second stage baking temperature is low at 0.7° C./min, falling below the lower limit of 1° C./min for the manufacturing method according to the present invention. Therefore, the mean crushing strength of secondary particles of the obtained lithium-metal complex oxide becomes large to 102.9 MPa, rising above the upper limit of 100 MPa for the mean crushing strength of the positive electrode active material according to the present invention. Therefore, the mean volume of pores having a diameter of 40 nm or less becomes small to 0.0009 cm³/g, falling below the lower limit of 0.001 cm³/g for the mean volume of the positive electrode active material according to the present invention. Hence, the output characteristics of the secondary battery are worsened.

In comparative example 12, the particle diameter of 6% of the particles contained in the metal complex hydroxide powders containing Ni, Co and Al, being the raw material hydroxide, is 20 μm or more, falling outside the range of the manufacturing method according to the present invention. Therefore the particle diameter of 6% of the particles of the obtained lithium-metal complex oxide is 20 μm or more, falling outside the range for the positive electrode active material according to the present invention. Moreover, the mean particle diameter becomes large to 13.40 μm rising above the upper limit of 13 μm for the mean particle diameter of the positive electrode active material according to the present invention.

Therefore, the initial discharge capacity of the secondary battery is worsened. Moreover, the rate characteristics drop, and the output characteristics of the secondary battery are worsened.

In comparative example 13, the raw material hydroxide is a metal complex hydroxide powder containing Ni, Co and Al which are aggregated in a flocculant. Powder with a low tap density of 0.78 g/cm³, falling below the lower limit of 1.7 g/cm³ for the manufacturing method according to the present invention, are used. Therefore, after a baking, the tap density is still low at 1.58 g/cm³, being below 2.2 g/cm³. Moreover, the strength for each particle is so small that it can not be measured. Furthermore, the mean volume of pores having a diameter of 40 nm or less is 0.0002 cm³/g, falling below the lower limit of 0.001 cm³/g for the mean volume of the positive electrode active material according to the present invention. Therefore, the battery characteristics such as the cycle characteristics and the output characteristics of the secondary battery, are worsened.

Figure 1:
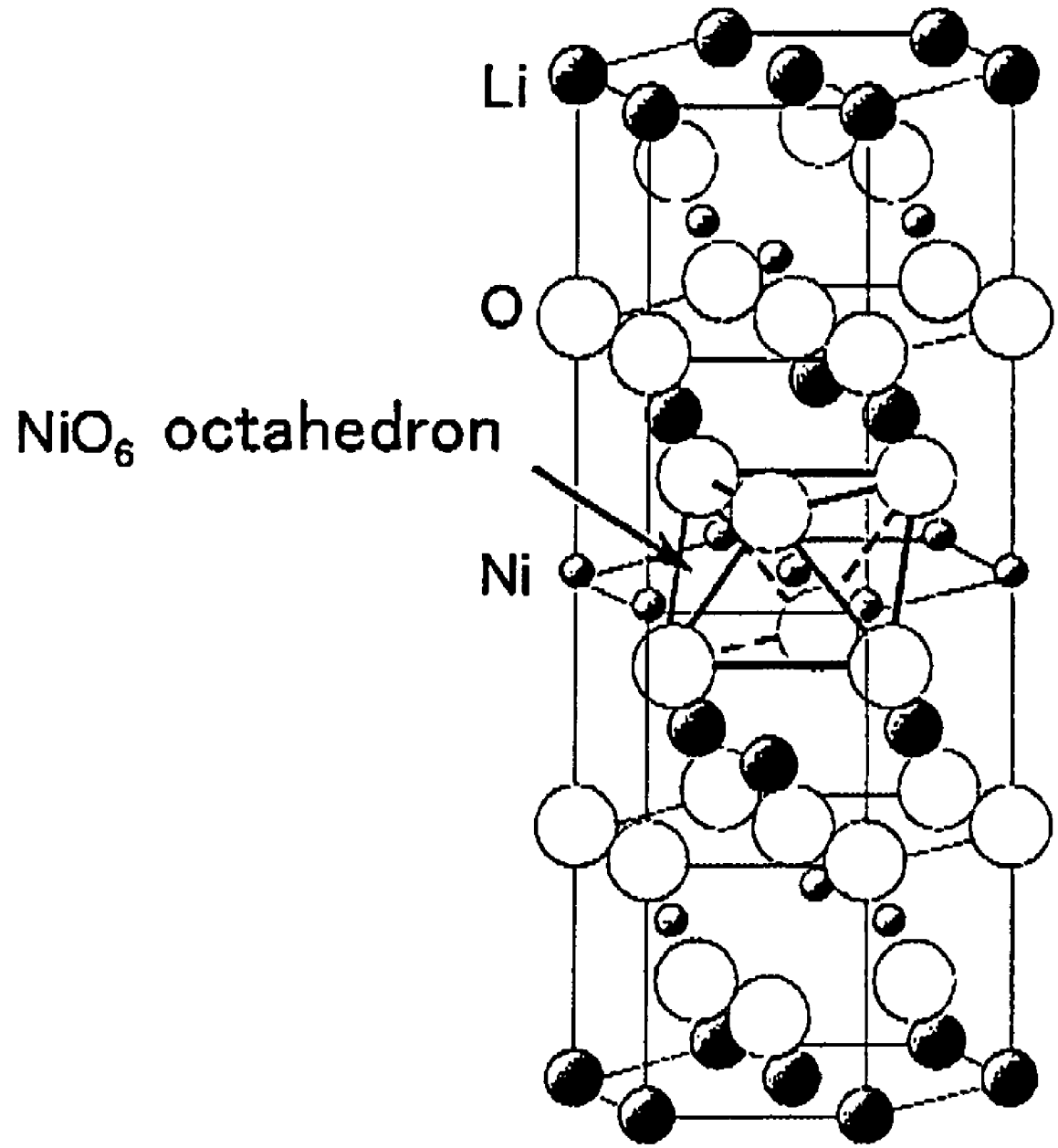
FIG. 1 is a schema showing a crystal structure of lithium nickelate ($LiNiO_2$) of a layered rock-salt structure.

The invention claimed is:

1. A positive electrode active material for a non-aqueous electrolyte secondary battery comprising:
primary particles of a lithium-metal complex oxide powder which is a lithium-metal complex oxide powder represented by $Li_zNi_{1-w}M_wO_2$, wherein M is at least one metal element selected from the group consisting of Co, Al, Mg, Mn, Ti, Fe, Cu, Zn, and Ga; and w and z respectively satisfy $0<w\leq0.25$, and $1.0\leq z\leq1.1$; and
secondary particles which are formed by aggregating a plurality of the primary particles,
wherein:
the shape of the secondary particles is spherical or spheroidal;
95% or more of the secondary particles have particle diameters of 20 μm or less;
a mean particle diameter of the secondary particles is between 7 and 13 μm;
a tap density of the particles is 2.2 g/cm³ or more;
in a pore distribution measurement using a nitrogen adsorption method, a mean volume of pores having a diameter of 40 nm or less in average is between 0.001 and 0.008 cm³/g; and
a mean crushing strength of the secondary particles is between 15 and 100 MPa.

2. A positive electrode active material for a non-aqueous electrolyte secondary battery comprising:
primary particles of a lithium-metal complex oxide powder which is a lithium-metal complex oxide powder represented by $Li_zNi_{1-x-y}T_xL_yO_2$, wherein T is at least one metal element selected from the group consisting of Co, and Mn; L is at least one metal element selected from the group consisting of Al, Mg, Ti, Fe, Cu, Zn, and Ga; and x, y, and z respectively satisfy $0<x<0.25$, $0<y\leq0.1$, $0<x+y\leq0.25$, and $1.0\leq z\leq1.1$; and
secondary particles which are formed by aggregating a plurality of the primary particles, wherein:
the shape of the secondary particles is spherical or spheroidal;
95% or more of the secondary particles have particle diameters of 20 μm or less;
a mean particle diameter of the secondary particles is between 7 and 13 μm;
a tap density of the particles is 2.2 g/cm³ or more;
in a pore distribution measurement using a nitrogen adsorption method, a mean volume of pores having a diameter of 40 nm or less in average is between 0.001 and 0.008 cm³/g; and
a mean crushing strength of the secondary particles is between 15 and 100 MPa.

3. A positive electrode active material for a non-aqueous electrolyte secondary battery according to claim 1 or claim 2, wherein for the lithium-metal complex oxide, on 3a sites where Li ions are to be arranged in a layered rock-salt structure of $LiNiO_2$, a site occupancy rate of metal ions other than Li ion is 2% or less.

4. A positive electrode active material for a non-aqueous electrolyte secondary battery according to claim 1 or claim 2, wherein the primary particles in the secondary particles are generally arranged radially from a center of the secondary particles.

5. A non-aqueous electrolyte secondary battery comprising a positive electrode wherein said positive comprises a positive electrode active material according to claim 1 or claim 2.

6. A manufacturing method for a positive electrode active material for a non-aqueous electrolyte secondary battery comprising:
a first step for producing a metal complex hydroxide containing Ni and metal M wherein:
M is at least one metal element selected from the group consisting of Co, Al, Mg, Mn, Ti, Fe, Cu, Zn, and Ga;

said metal complex hydroxide has a proportion of Ni:M=1−w:w (0<w≦0.25) in an atomic number ratio; and a tap density of 1.7 g/cm³ or more;

a second step for weighing the metal complex hydroxide obtained in the first step and lithium hydroxide so that a ratio of an atomic number of Li to a total atomic number of Ni and metal M is between 1.0 and 1.1, and mixing to obtain a compound; and a third step for raising the temperature of the compound obtained in the second step, from room temperature to 450 to 550° C. at a temperature rise rate of 0.5 to 15° C./min, holding for 1 to 10 hours at the reaching temperature, and performing first stage baking, and then further raising the temperature to 650 to 800° C. at a temperature rise rate of 1 to 5° C./min, holding for 0.6 to 30 hours at the reaching temperature, and performing second stage baking, and then furnace cooling to obtain a positive electrode active material for a non-aqueous electrolyte secondary battery.

7. A manufacturing method for a positive electrode active material for a non-aqueous electrolyte secondary battery comprising:

a first step for producing a metal complex hydroxide containing Ni and metal T wherein:

T is at least one metal element selected from the group consisting of Co and Mn; and said metal complex hydroxide has a proportion of Ni:T=1−x−y:x (0<x<0.25, 0<y≦0.1, and 0<x+y≦0.25) in an atomic number ratio and a tap density of 1.7 g/cm³ or more;

a second step for adding a compound of a metal L to the metal complex hydroxide obtained in the first step, L being at least one metal element selected from the group consisting of Al, Mg, Ti, Fe, Cu, Zn, and Ga, and mixing, and producing a compound A containing Ni and metal L with a proportion of Ni:L=1−x−y:y (0<x<0.25, 0<y≦0.1, and 0<x+y≦0.25) in an atomic number ratio;

a third step for weighing the compound A obtained in the second step and lithium hydroxide so that a ratio of an atomic number of Li to a total atomic number of Ni, metal T, and metal L is between 1.0 and 1.1, and mixing to obtain a compound B; and a fourth step for raising the temperature of the compound B obtained in the third step, from room temperature to 450 to 550° C. at a temperature rise rate of 0.5 to 15° C./min, holding for 1 to 10 hours at the reaching temperature, and performing first stage baking, and then further raising the temperature to 650 to 800° C. at a temperature rise rate of 1 to 5° C./min, holding for 0.6 to 30 hours at the reaching temperature, and performing second stage baking, and then furnace cooling to obtain a positive electrode active material for a non-aqueous electrolyte secondary battery.

8. A manufacturing method for a positive electrode active material for a non-aqueous electrolyte secondary battery comprising:

a first step for producing a metal complex hydroxide containing Ni, metal T, and metal L wherein:

T is at least one kind or more of metal elements selected from the Group consisting of Co and Mn;

L is at least one kind or more of metal elements selected from the group consisting of Al, Mg, Ti, Fe, Cu, Zn, and Ga; and said metal complex hydroxide has a proportion of Ni:T:L=1−x−y:x:y (0<x<0.25, 0<y≦0.1, and 0<x+y≦2.5) in an atomic number ratio, and a tap density of 1.7 g/cm³ or more;

a second step for weighing the metal complex hydroxide obtained in the first step and lithium hydroxide so that a ratio of an atomic number of Li a total atomic number of Ni, metal T, and metal L is between 1.0 and 1.1, and mixing to obtain a compound; and a third step for raising the temperature of the compound obtained in the second step, from room temperature to 450 to 550° C. at a temperature rise rate of 0.5 to 15° C./min, holding for 1 to 10 hours at the reaching temperature, and performing first stage baking, and then further raising the temperature to 650 to 800° C. at a temperature rise rate of 1 to 5° C./min, holding for 0.6 to 30 hours at the reaching temperature, and performing second stage baking, and then furnace cooling to obtain a positive electrode active material for a non-aqueous electrolyte secondary battery.

* * * * *